(12) United States Patent
Riedel (10) Patent No.: US 11,351,679 B2
(45) Date of Patent: Jun. 7, 2022

(54) ROBOT ARM HAVING AT LEAST ONE DEFORMATION ELEMENT

(71) Applicant: KUKA Deutschland GmbH, Augsburg (DE)

(72) Inventor: Martin Riedel, Augsburg (DE)

(73) Assignee: KUKA Deutschland GmbH, Augsburg (DE)

( * ) Notice: Subject to any disclaimer, the term of this patent is extended or adjusted under 35 U.S.C. 154(b) by 0 days.

(21) Appl. No.: 16/971,097

(22) PCT Filed: Feb. 15, 2019

(86) PCT No.: PCT/EP2019/053825
§ 371 (c)(1),
(2) Date: Aug. 19, 2020

(87) PCT Pub. No.: WO2019/158700
PCT Pub. Date: Aug. 22, 2019

(65) Prior Publication Data
US 2020/0376686 A1  Dec. 3, 2020

(30) Foreign Application Priority Data
Feb. 19, 2018   (DE) ...................... 10 2018 202 459.6

(51) Int. Cl.
*B25J 17/00* (2006.01)
*B25J 9/00* (2006.01)
(Continued)

(52) U.S. Cl.
CPC ............. *B25J 17/00* (2013.01); *B25J 9/0009* (2013.01); *B25J 9/12* (2013.01); *B25J 17/0225* (2013.01)

(58) Field of Classification Search
CPC ...... B25J 9/0009; B25J 17/00; B25J 17/0225; A61F 2002/30069; F16C 11/08; F16C 11/086
(Continued)

(56) References Cited

U.S. PATENT DOCUMENTS 2,292,676 A * 8/1942 Thiry .................. F16C 11/0633
403/133
4,229,839 A * 10/1980 Schwemmer ......... A61F 2/4241
403/120
(Continued)

FOREIGN PATENT DOCUMENTS

EP          0 959 256     * 11/1999
JP       2000158378 A      6/2000
(Continued)

OTHER PUBLICATIONS

European Patent Office; Search Report in related International Patent Application No. PCT/EP2019/053825 dated May 10, 2019; 2 pages.
(Continued)

*Primary Examiner* — William C Joyce
(74) *Attorney, Agent, or Firm* — Dorton & Willis, LLP (57) ABSTRACT

A robot arm includes multiple links and joints connecting the links to one another in an articulated manner, wherein, in cooperation with the joints, the links are designed to carry and move a load in space. The joints can be automatically adjusted by motors of the robot arm to move the links. At least one first link has a first casing and a neighboring second link has a second casing. The casings are designed to transfer respective forces and torques resulting from the weight of the robot arm itself and/or the load to the neighboring link. The first casing and/or the second casing has a deformation element designed to form a buffer body in a joint space between the first and second casings, which is changed due
(Continued)

to an adjustment of the associated joint. The buffer body at least substantially or completely fills the changeable joint space.

9 Claims, 4 Drawing Sheets

(51) Int. Cl.
 *B25J 9/12* (2006.01)
 *B25J 17/02* (2006.01)
(58) Field of Classification Search
 USPC .................................................. 403/120, 133
 See application file for complete search history.

(56) References Cited

U.S. PATENT DOCUMENTS

| | | | | |
|---|---|---|---|---|
| 4,555,198 A * | 11/1985 | Wenning | ............. | F16C 11/0604 403/130 |
| 4,739,692 A * | 4/1988 | Wassam | ..................... | B25J 9/06 901/21 |
| 4,971,285 A * | 11/1990 | Bechu | ..................... | F16F 1/393 248/634 |
| 5,507,823 A * | 4/1996 | Walston | ................ | A61F 2/4241 623/23.41 |
| 5,674,296 A * | 10/1997 | Bryan | .................... | A61F 2/4425 623/17.16 |
| 6,588,967 B2 * | 7/2003 | Rivin | .................. | F16C 11/0661 403/130 |
| 2008/0193207 A1 * | 8/2008 | Kruse | ..................... | G01M 3/26 403/133 |
| 2015/0127114 A1 * | 5/2015 | Zhao | ................... | A61F 2/30756 623/22.13 |
| 2017/0080582 A1 | 3/2017 | Mugnier et al. | | |

FOREIGN PATENT DOCUMENTS

| | | |
|---|---|---|
| JP | 2002307372 A | 10/2002 |
| JP | 2010137288 A | 6/2010 |
| JP | 2015166117 A | 9/2015 |

OTHER PUBLICATIONS

European Patent Office; International Preliminary Report on Patentability in related International Patent Application No. PCT/EP2019/053825 dated Aug. 27, 2020; 7 pages.

* cited by examiner

ROBOT ARM HAVING AT LEAST ONE DEFORMATION ELEMENT

CROSS-REFERENCE TO RELATED APPLICATIONS

This application is a national phase application under 35 U.S.C. § 371 of International Patent Application No. PCT/EP2019/053825, filed Feb. 15, 2019 (pending), which claims the benefit of priority to German Patent Application No. DE 10 2018 202 459.6, filed Feb. 19, 2018, the disclosures of which are incorporated by reference herein in their entirety.

TECHNICAL FIELD

The invention relates to a robot arm comprising a multiple links and multiple joints which connect the links to one another in an articulated manner, wherein, in cooperation with the joints, the links are designed to carry a load and to move same in space, and the joints can be automatically adjusted by means of motors of the robot arm in order to move the links, wherein, of the links, at least one first link has a first casing and a respective neighboring second link has a second casing, wherein the casings are designed to transfer forces and torques occurring as a result of the weight of the robot arm itself and/or the load to the neighboring link, and wherein the at least one first link and/or the second link has a deformation element.

BACKGROUND

US 2017/0080582 A1 describes a humanoid robot with arms and legs having links and joints. The links have flexible areas at areas close to the joints.

SUMMARY

The object of the invention is to create a robot arm whose changeable joint spaces, which are formed by neighboring links of a joint of the robot arm connecting and moving the links, are protected against manual intervention in the changeable joint spaces.

This object is solved by a robot arm, comprising:
several links and several joints, which connect the links to one another in an articulated manner, wherein the links, in cooperation with the joints, are designed to carry a load and to move same in space, and the joints can be automatically adjusted by means of motors of the robot arm in order to move the links,
wherein, of the links, at least one first link has a first casing and a respective neighboring second link has a second casing, and the casings are designed to transfer forces and torques occurring due to the weight of the robot arm itself and/or the load to the neighboring link,
and wherein the first casing of the at least one first link and/or the second casing of the second link has a deformation element which is designed to form, in a joint space between the first casing and the second casing which can be changed as a result of an adjustment of the associated joint, a buffer body which at least substantially or completely fills the changeable joint space.

Robot arms, in particular industrial robots, are working machines which can be equipped with tools for the automatic handling and/or processing of objects, their links being programmable by means of their joints in several axes of movement, for example with regard to orientation, position and work sequence.

An industrial robot generally comprises the robot arm and a programmable controller (control device), which controls or regulates the sequences of movements of the industrial robot during operation, in that one or more automatically or manually adjustable joints (robot axes) are moved by, in particular, electric motors or drives, in that the controller controls or regulates the motors or drives.

Robot arms may, inter alia, comprise a frame and a carousel mounted rotatably relative to the frame by means of a joint, on which a rocker arm is mounted pivotably by means of another joint. An arm extension can in turn be pivotally mounted on the rocker arm by means of another joint. The arm extension carries a robot hand, whereby in this respect the extension arm and/or the robot hand can exhibit several further joints.

The robot arm having several links connected via joints can be configured as a jointed-arm robot with several links and joints arranged in series one after the other, in particular the robot arm can be designed as a six-axis jointed-arm robot or a seven-axis jointed-arm robot. In another type of embodiment, the robot arm can be a horizontal articulated arm robot, i.e. a SCARA robot.

The load to be carried by the robot arm and moved in space can be formed by a tool, such as a gripper, attached to a hand flange of the robot arm. Alternatively, or in addition to a tool or gripper, the load can also be formed by a workpiece to be handled or processed. In order to be able to hold and move such loads, forces and torques must be transferred through the supporting structure of the robot arm. In order to form a load-bearing extension arm in particular, axially extending casing bodies can therefore be designed with cavities, in which the casing body absorbs all forces and torques of the load and motors, drives, gears and supply lines are arranged in the cavities. The hollow casing bodies can, in particular, have a tubular design.

A motor or drive and/or a gear unit can be assigned to each joint that connects two neighboring links, so that they can be adjusted relative to each other. Each gear serves to transmit or reduce a speed or torque introduced by the motor or drive and to make it possible to adjust one link relative to the neighboring link.

The drive may in particular comprise an electric motor comprising a rotor with an electric rotor winding and a drive shaft and a stator with an electric stator winding, which may in particular be accommodated in a drive casing. The rotor may be connected to an input part of the gear, in particular by connecting the drive shaft, in particular a hollow shaft of the drive, to a hollow gear shaft of the gear, or even by forming a common hollow shaft in one piece with the drive.

Since the first casing of the at least one first link and/or the second casing of the second link has a deformation element, which is designed to form a buffer body which at least substantially or completely fills the changeable joint space in a changeable joint space between the first casing and the second casing as a result of an adjustment of the associated joint, the respective changeable joint space is secured against manual intervention.

The buffer body is designed to fill the joint space in such a way that a person—whether unintentionally or intentionally—cannot even intervene in the joint space. By placing the buffer body inside the joint space or covering the joint space, taking into account the respective external contour shape of the links, an area of the robot arm that is at risk of becoming jammed is eliminated. Due to the deformability of the buffer body and its outer adapted shape, the buffer body can adapt to the geometrical changeability of the joint space.

The joint associated with the at least one first link and the second link may be a swivel joint adapted to move the first link and the second link in a scissor-like movement towards each other, forming a changeable joint space wedge, the changeable joint space wedge to be filled by the buffer body being limited by the first casing of the first link and the second casing of the second link.

The changeable joint space wedge can be produced insofar as one link of the robot arm at its associated joint is moved, i.e. adjusted, against the respective neighboring link of the robot arm.

The changeable joint space, in particular the changeable joint space wedge of the buffer body can be at least substantially or completely filled over a gap space, whose gap space opening width between the first casing of the first link and the second casing of the second link is greater than 5 millimeters.

If the gap space opening width is generally not more than 5 millimeters, there is no special need for separate protection, since in such a narrow space, intervention by a person is generally not possible.

The buffer body may be designed to fill the changeable joint space, in particular the changeable joint space wedge or the space, to such an extent that a residual space width between the first casing of the first link and the second casing of the second link of not more than 5 millimeters remains.

If the gap space opening width is greater than 5 millimeters, the gap space must be covered by the buffer body. The buffer body may cover the space completely. Alternatively, it may be sufficient for the buffer body to cover the space only to such an extent that only a residual space of at most 5 millimeters remains. This can be particularly useful in order to prevent the buffer body from standing up against or grinding against the other link, which can move relative to the buffer body.

The buffer body may be attached to the at least one first link and, in its undeformed basic shape, be designed to maintain a minimum distance of 1 to 5 millimeters from the second link.

The buffer body may be attached to the second link and may be designed to maintain a minimum distance of 1 to 5 millimeters from the at least one first link in its undeformed basic shape.

The buffer body can have at least one rigid frame body, which is mounted on the buffer body so as to be movable relative to the first casing of the first link and relative to the second casing of the second link and is connected to at least one spring body of the buffer body, which is designed to position the at least one rigid frame body in a state free from external forces in a basic position.

The buffer body can consist entirely of an elastic molded body, which is designed to bring the buffer body into its undeformed basic shape in a state free from external forces due to its inherent elasticity.

The elastic molded body can be designed, due to its compression between the first casing of the first link and the second casing of the second link, to bulge out of the joint space, in particular out of the joint gap wedge, compared to its undeformed basic shape.

Depending on the shape of the deformable area of the elastic molded body and/or the protective lip, it is pressed outwards when compressed by the other link, or between two links, so that it bulges out. This additionally reduces the risk of crushing, since links of the body, such as hands or fingers, which are in contact or close by, are additionally pushed outwards, i.e. are pushed away from the area of the changeable joint space by the bulging of the elastic molded body and/or the protective lip.

The molded body may have a lower stiffness and/or higher elasticity in the direction of movement predetermined by the relative movement of the first casing of the first link to the second casing of the second link, and may have a higher stiffness and/or lower elasticity in a transverse direction extending transversely to the predetermined direction of movement.

The at least one first link, the second link and/or the molded body can have a sensor, which is designed to detect the joint space existing between the first casing of the first link and the second casing of the second link, in particular the joint space wedge in its space width.

The molded body can be equipped with a movement device, which is designed to actively move the molded body from its basic shape into a deformation shape deviating from the basic shape.

In one aspect, the invention can be based on a two-stage principle of action, which can be carried out purely passively or can have additional sensors in variants.

In a first stage or phase, it may be intended that the joint moves in a normal range, i.e. far from the range limits of the respective joint. This normal range generally represents the largest part of the joint mobility. It comprises about 70-90% of all movements. This is where the main danger of retraction exists. A specially shaped buffer body connected to the relevant link can be positioned in such a way that the buffer body does not touch the relevant link in this first stage or phase and forms a narrow space, in particular a space of less than or equal to 5 millimeters to the (partially) cylindrical outer surface.

The buffer body can be designed so as to be flexible in the direction of joint movement and as stiff or rigid as possible in a direction transverse to the direction of joint movement. Either individual areas can be flexible or the entire buffer body can be designed in the form of an elastic, especially rubber-like lip. In the case of an elastic lip, in particular the combination of elements which tend to be stiff in the direction transverse to the direction of joint movement, e.g. pronounced ribs or hard lamellae, and soft elements in the direction of joint movement, e.g. elastomer or cavities, can produce the desired characteristic of flexibility. The buffer body can thus protect against accidental insertion, as the space is always sufficiently narrow and the outer surface has a repellent effect due to the radial stiffness. A design as a combination of elastic elements, e.g. a leaf spring, and a hard but movable orifice plate, are also possible. In particular, accidental retraction can be understood to mean that objects, such as articles of clothing, hair, papers or fingers of a person, which inadvertently enter the area of the changeable space, are drawn into the changeable space due to the relative movement of the neighboring links of the joint in question.

The protective lip formed by the buffer body can be mass-produced and at very low cost, for example as a cut-off continuous profile, depending on the geometric characteristics of the joint location.

If, in a second stage or phase, the joint moves into its limit areas, it is not restricted in its mobility by the protective element, i.e. the buffer body, which is flexible in the direction of joint movement. In this second phase, the associated link touches in particular an upper lip area, preferably linearly, and presses it in the direction of the link. Due to the spatial proximity of the lip edge to the axis of rotation, the deformation can be generated very easily and without additional motor torque or additional actuator. It can even be assumed that the additional torque is within the range of the measuring accuracy of a robot's internal joint torque sensor, if present, and thus does not influence it. The relative movement of the lip edge with respect to the other link is very small in the contact state for geometric reasons, which means that wear can be reduced.

Depending on the design of the deformable area of the protective lip, it is pressed outwards by the other link when compressed. This also reduces the danger of crushing, as resting links of the body, such as hands, are pushed outwards.

The pure protective function by rejecting, stopping and/or pushing out can be achieved in particular in a purely passive way. It ensures that no unintentional retraction or jamming can occur. If one also wants to exclude incorrect use, this can be monitored by a sensor, for example. For this purpose, a sensor in one embodiment can monitor the space by integrating a light barrier in the longitudinal direction of the space, i.e. the axial direction of the joint. By comparison with a safe position detection of the joint position, it is also possible to detect in safe technology, whether the protective lip was bent down by an external process, such as intentional manipulation by a person, and not pressed down by the other link due to the system, for example.

A simple contact strip, which can be placed on the lip or integrated, also makes such monitoring possible.

If the protective lip is not to be pressed down by the outer surface of the other link, but instead recedes back without contact, it is also possible to create designs in which the lip is moved internally, i.e. underneath the structural lining, for example, by means of a type of baffle guide or curve elements.

With the exemplary embodiments according to the principles of the present invention, clamping and retraction points in robots can thus be protected, especially in the case of narrow joint structures (fork structure, little or no layering), and good mobility in the joints can still be maintained. The designs for protection are at least predominant or purely passive and very cost-effective and can provide a basis for the safe implementation of robots with joints in fork construction for applications in the field of human-robot collaboration.

Concrete exemplary embodiments of the invention are explained in detail in the following figure description with reference to the attached figures. Concrete features of these exemplary embodiments may, irrespective of the concrete context in which they are mentioned, be general features of the invention, if necessary considered individually or in other combinations of features.

BRIEF DESCRIPTION OF THE DRAWINGS

The accompanying drawings, which are incorporated in and constitute a part of this specification, illustrate exemplary embodiments of the invention and, together with a general description of the invention given above, and the detailed description given below, serve to explain the principles of the invention.

DETAILED DESCRIPTION

Figure 1:
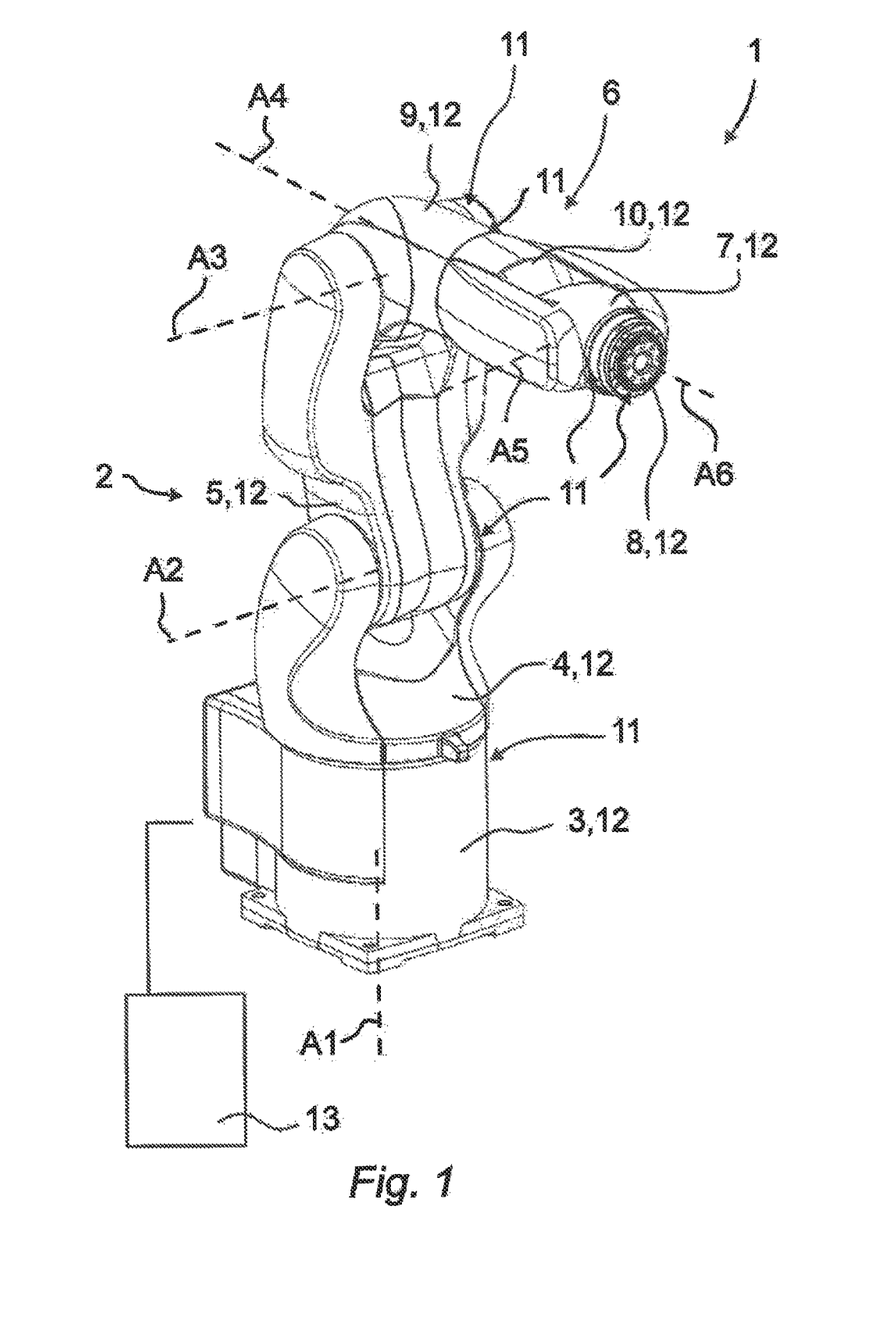
FIG. 1 depicts an exemplary industrial robot with a robot arm and a robot controller.
Figure 2:
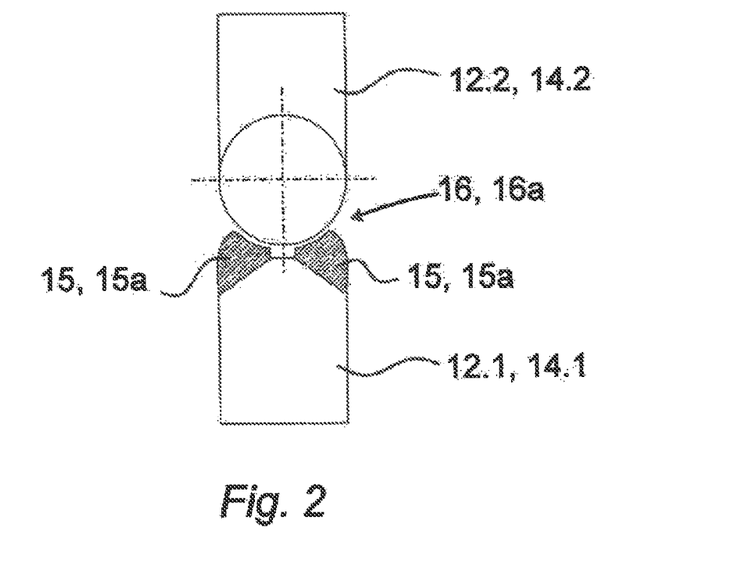
FIG. 2 is a schematic representation of an exemplary joint of a robot arm, with a first link, a second link and a buffer body according to the principles of the invention in a basic position.
Figure 3:
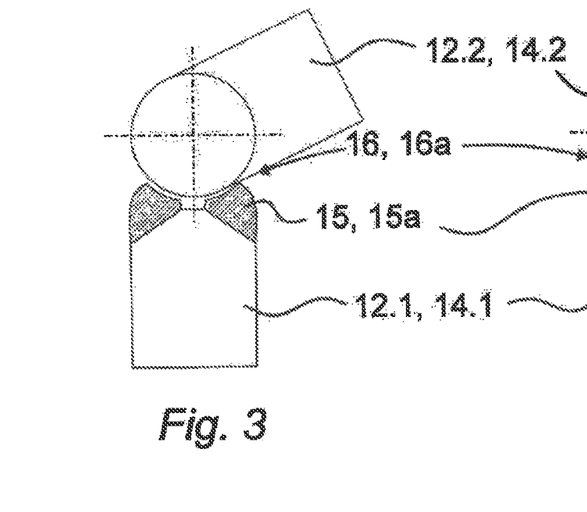
FIG. 3 is a schematic representation of the joint according to FIG. 2 with the buffer body in a joint position in the normal range.

FIG. 1 shows a robot 1, which has a robot arm 2 and a robot controller 13. In the case of the present exemplary embodiment, the robot arm 2 comprises several links 12, arranged one after the other and connected by means of joints 11. The links 12 are in particular a base frame 3 and a carousel 4, which is mounted so as to be rotatable relative to the frame 3 about a vertically extending axis of rotation A1. The rocker arm 5 is mounted at the lower end, e.g. on a rocker bearing head on the carousel 4, which is not shown in detail, so as to be pivotable about a preferably horizontal axis of rotation A2. At the upper end of the rocker arm 5 the arm extension 6 is again mounted, so as to be pivotable around a preferably horizontal axis of rotation A3. This arm supports the robot hand 7 with its preferably three axes of rotation A4, A5, A6. In this exemplary embodiment, the arm extension 6 has a base arm 9, which is pivotably mounted on the rocker arm 5. A front arm 10 of the arm extension 6 is mounted on the base arm 9, so that it can rotate about the rotation axis A4. Further links of the robot arm 2 in this exemplary embodiment are, in addition to the base frame 3, the carousel 4, the rocker arm 5 and the base arm 9, the links 12 of the preferably multi-axis robot hand 7 with a mounting device designed as a connecting flange 8 for mounting an end effector not shown, such as a tool or a gripper.

Accordingly, the robot arm 2 in the case of the present exemplary embodiment has a base frame 3, a carousel 4 mounted on the base frame 3 by means of a first joint 11 of the robot arm 2, so as to be rotatable about a first axis of rotation A1, a rocker arm 5 mounted on the carousel 4 by means of a second joint 11 of the robot arm 2, so as to be pivotable about a second axis of rotation A2, a base arm 9 mounted on the rocker arm 5 by means of a third joint 11 of the robot arm 2, so as to be rotatable about a third axis of rotation A3, and a multi-axis robot hand 7 mounted on the base arm 9.

Of the links 12, as shown in FIGS. 2 to 11, a representative first link 12.1 having a first casing 14.1 is shown and a representative neighboring second link 12.2 having a second casing 14.2 is shown. The casings 14.1, 14.2 are designed to transfer forces and torques occurring due to the weight of the robot arm 2 itself and/or the load to the neighboring link 12.1, 12.2 respectively.

The first casing 14.1 of the at least one first link 12.1 has, in the case of the present exemplary embodiment, a deformation element 15a, which is designed to form a buffer body 15 in a joint space 16 between the first casing 14.1 and the second casing 14.2, which can be changed due to an adjustment of the associated second joint 12.2, and which at least substantially or completely fills the variable joint space 16.

In the cases of the present exemplary embodiments, the respective joints 11 associated with the first link 12.1 and the second link 12.2 are designed as swivel joints, each of which is formed to move the first link 12.1 and the second link 12.2 against each other in a scissor-like movement, forming a changeable joint space wedge 16a, wherein the changeable joint space wedge 16a to be filled by the buffer body 15 is limited by the first casing 14.1 of the first link 12.1 and the second casing 14.2 of the second link 12.2.

The changeable joint space 16, in particular the changeable joint space wedge 16a, is at least substantially or completely filled by the buffer body 15 over a gap space, whose gap space opening width between the first casing 14.1 of the first link 12.1 and the second casing 14.2 of the second link 12.1 is greater than 5 millimeters.

Figures 7, 8:
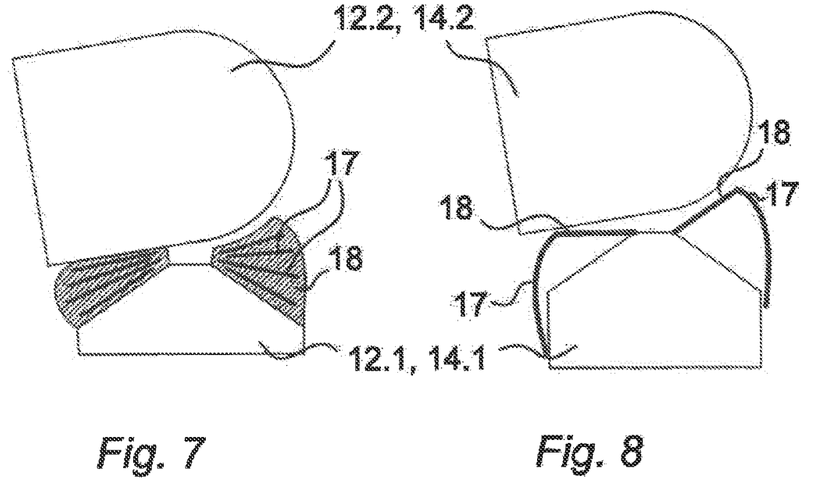
FIG. 7 is a schematic representation of the joint according to FIG. 2 with a buffer body comprising rigid frame bodies and flexible linings.
FIG. 8 is a schematic representation of the joint according to FIG. 2 with a buffer body comprising an adjustable, rigid frame body.

According to FIG. 7 and FIG. 8, the buffer body 15 has at least one rigid frame body 17 which is mounted on the buffer body 15 so as to be movable relative to the first casing 14.1 of the first link 12.1 and relative to the second casing 14.2 of the second link 12.2 and is connected to at least one spring body 18 of the buffer body 15, which is designed to position the at least one rigid frame body 17 in a basic position in a state free from external forces. In the case of the embodiment variant according to FIG. 7, the rigid framework body 17 is formed by several accordion-like ribs, which are encased in an elastomeric layer. The elastomeric layer forms an outer sheath-like spring body 18, which at the same time forms an outer skin of the buffer body 15. In the case of the embodiment variant according to FIG. 8, the rigid frame body 17 forms apron-like sheathed surfaces, which are attached to separate levers. The apron-like sheathed surfaces are attached to the free ends of the levers. The separate levers may comprise inherent or separate spring means forming a spring body 18 to move the separate levers and thereby bring the apron-like sheathed surfaces into their initial positions.

Figures 5, 6:
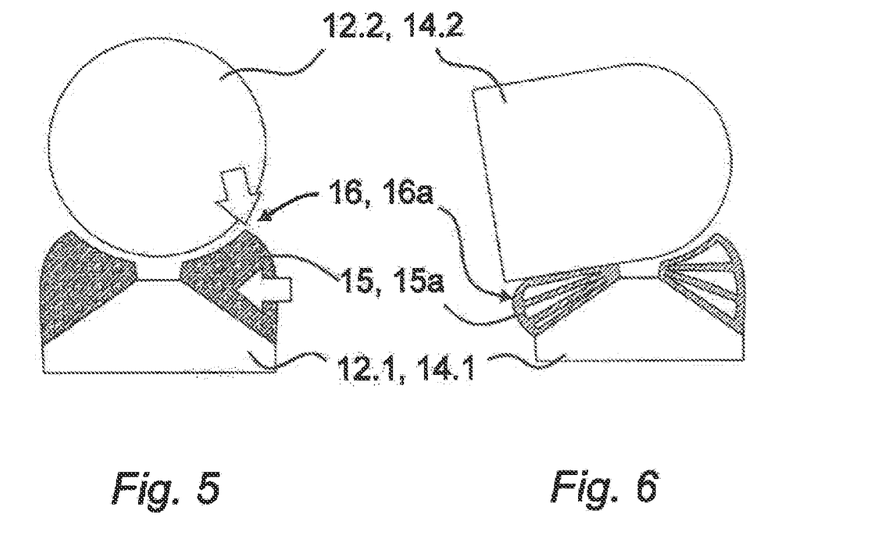
FIG. 5 is a schematic representation of the joint as shown in FIG. 2 with an indication of areas of high and low stiffness.
FIG. 6 is a schematic representation of the joint according to FIG. 2 with a buffer body comprising cavities.

According to the embodiments in FIG. 5 and FIG. 6, however, the buffer body 15 is made entirely of an elastic molded body, which is designed to bring the buffer body 15 to its undeformed basic shape in a state free from external forces due to its inherent elasticity. For this purpose, the elastic buffer body 15 can have air chambers, for example. Several air chambers can be separated by radially extending struts. In particular, the struts can be formed in one piece by the elastic material of the elastic buffer body 15.

Figure 4:
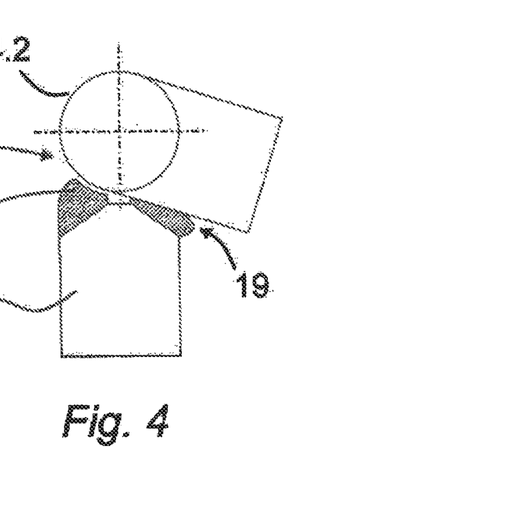
FIG. 4 is a schematic representation of the joint according to FIG. 2 with the buffer body in a joint position in the limit area.

As indicated in particular in FIG. 4, the elastic molded body 15, due to its compression between the first casing 14.1 of the first link 12.1 and the second casing 14.2 of the second link 12.2, compared to its basic undeformed shape (see FIG. 2 or FIG. 3), may bulge out of the joint space 16, in particular the joint space wedge 16a, as indicated by the reference sign 19 in FIG. 4.

Figure 9:
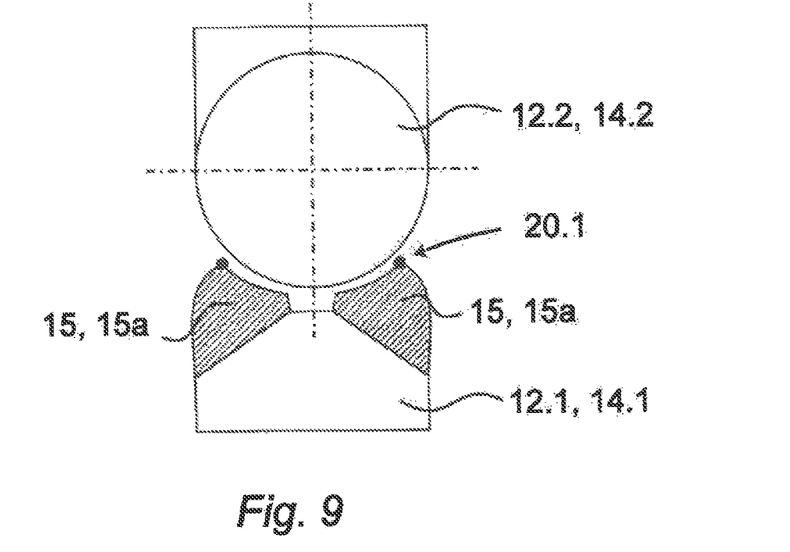
FIG. 9 is a schematic representation of the joint according to FIG. 2 with a buffer body equipped with a sensor in the form of a light barrier.
Figures 10, 11:
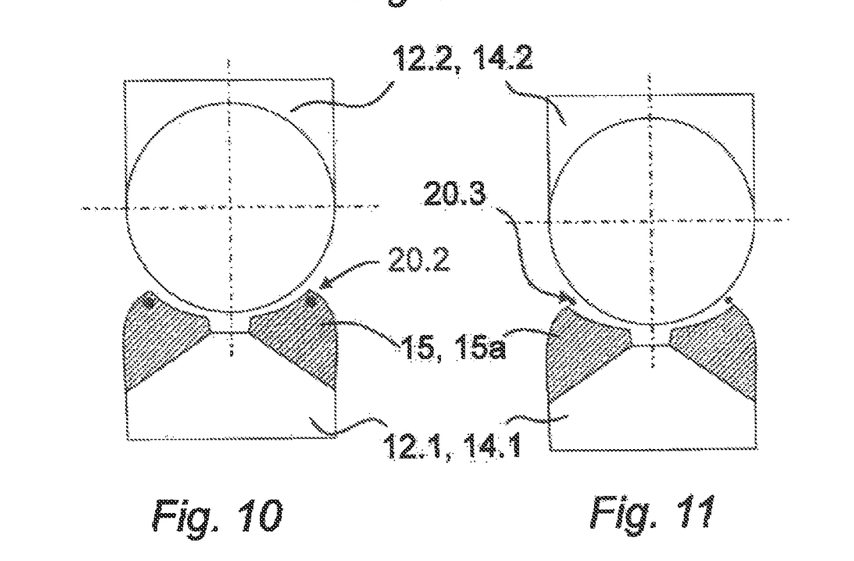
FIG. 10 is a schematic representation of the joint according to FIG. 2 with a buffer body provided with an externally mounted sensor.
FIG. 11 is a schematic representation of the joint according to FIG. 2 with a buffer body provided with a sensor mounted on the inside the buffer body.

FIG. 9 to FIG. 11 show how the first link 12.1, the second link 12.2 and/or the molded body 15 has at least one sensor 20.1, 20.2, 20.3 which is designed to detect the space width of the joint space 16 existing between the first casing 14.1 of the first link 12.1 and the second casing 14.2 of the second link 12.2, in particular the joint space wedge 16a.

In FIG. 9, the at least one sensor 20.1 is designed as a light barrier acting in the joint space 16, in particular in the joint space wedge 16a. In FIG. 10, the at least one sensor 20.2 is designed as a sensor 20.2 arranged on the outer surface of the molded body 15. In FIG. 11, the at least one sensor 20.3 is designed as a sensor 20.2 arranged inside the molded body 15.

While the present invention has been illustrated by a description of various embodiments, and while these embodiments have been described in considerable detail, it is not intended to restrict or in any way limit the scope of the appended claims to such detail. The various features shown and described herein may be used alone or in any combination. Additional advantages and modifications will readily appear to those skilled in the art. The invention in its broader aspects is therefore not limited to the specific details, representative apparatus and method, and illustrative example shown and described. Accordingly, departures may be made from such details without departing from the spirit and scope of the general inventive concept.

What is claimed is:

1. A robot arm, comprising:
   a plurality of links connected to one another in an articulated manner by respective joints, wherein the links, in cooperation with the joints, are configured to carry and move a load in space, and the joints are automatically adjustable by motors of the robot arm in order to move the links;
   wherein at least one first link has a first casing, and a respective neighboring second link has a second casing, and the first and second casings are configured to transfer respective forces and torques to the neighboring link due to at least one of the weight of the robot arm itself or the load;
   at least one of the first casing or the second casing comprising a deformation element;
   wherein the deformation element is configured to form a buffer body in a joint space between the first casing and the second casing, and the joint space varies with adjustment of the associated joint;
   wherein the buffer body at least substantially or completely fills the variable joint space;
   the buffer body is formed entirely from an elastic molded body;
   the molded body has at least one of a lower stiffness or a higher elasticity in a direction of movement predetermined by movement of the first casing of the first link relative to the second casing of the second link; and
   the molded body has at least one of a higher stiffness or a lower elasticity in a direction extending transverse to the predetermined direction of movement.

2. The robot arm of claim 1, wherein:
   the joint associated with the at least one first link and the second link is a pivot joint configured to move the first link and the second link in a pivoting movement relative to one another, thereby forming a variable joint space wedge; and
   the variable joint space wedge filled by the buffer body is limited by the first casing of the first link and the second casing of the second link.

3. The robot arm of claim 1, wherein the variable joint space is a joint space wedge.

4. The robot arm of claim 1, wherein:
   the buffer body comprises at least one rigid frame body mounted on the buffer body so as to be movable relative to the first casing of the first link and movable relative to the second casing of the second link;

the at least one rigid frame body connected to at least one spring body of the buffer body, the at least one spring body configured to position the at least one rigid frame body in a basic position when the buffer body is in a state free from external forces.

5. The robot arm of claim 1, wherein:
at least one of the at least one first link, the second link, or the molded body has a sensor configured to detect the joint space between the first casing of the first link and the second casing of the second link.

6. The robot arm of claim 5, wherein:
a variable joint space wedge is formed between the at least one first link and the second link; and
the sensor is configured to detect the joint space wedge.

7. The robot arm of claim 1, wherein:
the molded body is equipped with a movement device configured to actively move the molded body from its undeformed basic shape into a deformation shape deviating from the basic shape.

8. A robot arm, comprising:
a plurality of links connected to one another in an articulated manner by respective joints, wherein the links, in cooperation with the joints, are configured to carry and move a load in space, and the joints are automatically adjustable by motors of the robot arm in order to move the links;
wherein at least one first link has a first casing, and a respective neighboring second link has a second casing, and the first and second casings are configured to transfer respective forces and torques to the neighboring link due to at least one of the weight of the robot arm itself or the load;
at least one of the first casing or the second casing comprising a deformation element;
wherein the deformation element is configured to form a buffer body in a joint space between the first casing and the second casing, and the joint space varies with adjustment of the associated joint;
wherein the buffer body at least substantially or completely fills the variable joint space;
wherein the buffer body is formed entirely from an elastic molded body, the elastic molded body configured to bring the buffer body into its undeformed basic shape in a state free from external forces due to its elasticity;
wherein the elastic molded body is configured, due to compression between the first casing of the first link and the second casing of the second link, to bulge out of the joint space, compared to its undeformed basic shape;
wherein the molded body has at least one of a lower stiffness or a higher elasticity in a direction of movement predetermined by movement of the first casing of the first link relative to the second casing of the second link; and
the molded body has at least one of a higher stiffness or a lower elasticity in a direction extending transverse to the predetermined direction of movement.

9. The robot arm of claim 8, wherein:
a variable joint space wedge is formed between the at least one first link and the second link; and
the elastic molded body is configured to bulge out of the joint space wedge due to compression between the first casing and the second casing.

* * * * *